"""(12) United States Patent
Sims, III et al.

(10) Patent No.: US 9,715,877 B2
(45) Date of Patent: Jul. 25, 2017

(54) SYSTEMS AND METHODS FOR A NAVIGATION SYSTEM UTILIZING DICTATION AND PARTIAL MATCH SEARCH

(71) Applicant: GM GLOBAL TECHNOLOGY OPERATIONS LLC, Detroit, MI (US)

(72) Inventors: Robert D. Sims, III, Milford, MI (US); Timothy J. Grost, Clarkston, MI (US); Greg T. Lindemann, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/314,576

(22) Filed: Jun. 25, 2014

(65) Prior Publication Data
US 2015/0379995 A1 Dec. 31, 2015

(51) Int. Cl.
*G10L 15/26* (2006.01)
*G01C 21/36* (2006.01)
*G06F 17/30* (2006.01)

(52) U.S. Cl.
CPC .......... *G10L 15/26* (2013.01); *G01C 21/3608* (2013.01); *G06F 17/30554* (2013.01); *G06F 17/30864* (2013.01)

(58) Field of Classification Search
None
See application file for complete search history.

(56) References Cited

U.S. PATENT DOCUMENTS

| 8,521,539 | B1* | 8/2013 | Teng | G01C 21/3608 701/418 |
| 2010/0211390 | A1* | 8/2010 | Hillebrecht | G10L 15/08 704/240 |
| 2011/0054898 | A1* | 3/2011 | Phillips | G10L 15/30 704/235 |
| 2011/0093271 | A1* | 4/2011 | Bernard | G06F 17/2785 704/257 |

\* cited by examiner

*Primary Examiner* — Qian Yang
(74) *Attorney, Agent, or Firm* — Lorena & Kopf, LLP

(57) ABSTRACT

A method searching navigation system data includes receiving a spoken utterance from a user, processing the spoken utterance to produce a dictation text substantially corresponding to the spoken utterance, and querying the navigation system data with the dictation text using an approximate string matching criteria and producing a results list associated therewith.

20 Claims, 3 Drawing Sheets

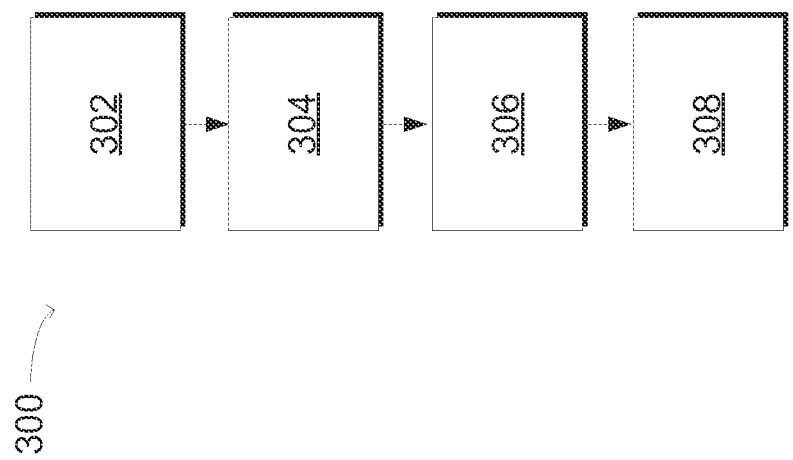

SYSTEMS AND METHODS FOR A NAVIGATION SYSTEM UTILIZING DICTATION AND PARTIAL MATCH SEARCH

TECHNICAL FIELD

The technical field generally relates to speech systems, and more particularly relates to methods and systems for point-of-interest searching in such systems.

BACKGROUND

Vehicle spoken dialog systems (or "speech systems") perform, among other things, speech recognition based on speech uttered by occupants of a vehicle. The speech utterances typically include commands that communicate with or control one or more features of the vehicle as well as other systems (e.g., embedded navigation systems) that are accessible by the vehicle. In general, speech system generates spoken commands in response to the speech utterances, and in some instances, the spoken commands are generated in response to the speech system needing further information in order to perform the speech recognition.

A navigation system database will generally include both phonetic data (e.g., the spoken names of points of interest) and text data. However, the phonetic data in some cases can be quite limited, and may require the user to provide a speech utterance that is an exact, word-for-word match with an item (or a small number of items) stored in the navigation system database. That is, for example, the navigation system database might include phonetic data for a point-of-interest corresponding to "Phil's Bar and Grill." In such a case, the system might not be able to find that result when the user speaks the abbreviated phrase "Phil's", even if the latter is the most common way that people refer to that point of interest.

Accordingly, it is desirable to provide improved methods and systems for searching for points-of-interest and other such data in a vehicular navigation system. Furthermore, other desirable features and characteristics of the present invention will become apparent from the subsequent detailed description and the appended claims, taken in conjunction with the accompanying drawings and the foregoing technical field and background.

SUMMARY

A method searching navigation system data in accordance with one embodiment includes receiving a spoken utterance from a user, processing the spoken utterance to produce a dictation text substantially corresponding to the spoken utterance, and querying the navigation system data with the dictation text using an approximate string matching criteria and producing a results list associated therewith.

In accordance with one embodiment, a navigation system for a vehicle includes: a storage component for storing navigation system data; a dictation module configured to receive a spoken utterance from a user and process the spoken utterance to produce a dictation text substantially corresponding to the spoken utterance; and a search module configured to query the navigation system data with the dictation text using an approximate string matching criteria and to produce a results list associated therewith.

DESCRIPTION OF THE DRAWINGS

The exemplary embodiments will hereinafter be described in conjunction with the following drawing figures, wherein like numerals denote like elements, and wherein:

FIG. 3 is a flowchart depicting a method of performing a point-of-interest search in connection with a navigation system.

DETAILED DESCRIPTION

The subject matter described herein generally relates to the the use of a dictation module in connection with a "fuzzy" or "approximate text" search engine to query a navigation system database to find, for example, points-of-interest that are otherwise difficult locate by searching phonetic data alone. In this regard, the following detailed description is merely exemplary in nature and is not intended to limit the application and uses. Furthermore, there is no intention to be bound by any expressed or implied theory presented in the preceding technical field, background, brief summary or the following detailed description. As used herein, the term "module" refers to an application specific integrated circuit (ASIC), an electronic circuit, a processor (shared, dedicated, or group), storage media (e.g., non-transitory media), and memory that executes one or more computer-readable software or firmware programs, a combinational logic circuit, and/or other suitable components that provide the described functionality.

Figure 1:
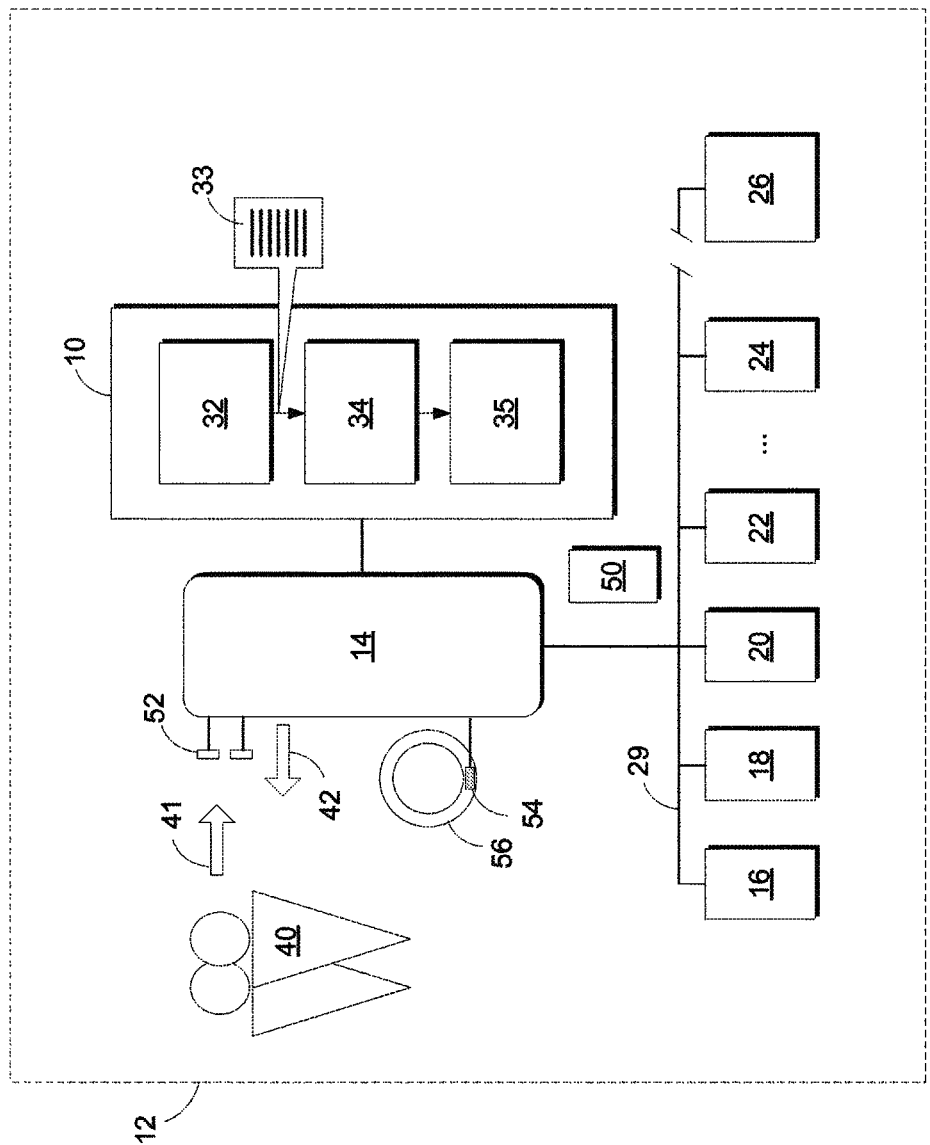
FIG. 1 is a functional block diagram of a vehicle including a speech system in accordance with various exemplary embodiments.

Referring now to FIG. 1, in accordance with exemplary embodiments of the subject matter described herein, a spoken dialog system (or simply "speech system") 10 is provided within a vehicle 12. In general, speech system 10 provides speech recognition, dialog management, and speech generation for one or more vehicle systems through a human machine interface module (HMI) module 14 configured to be operated by (or otherwise interface with) one or more users 40 (e.g., a driver, passenger, etc.). Such vehicle systems may include, for example, a phone system 16, a navigation system 18, a media system 20, a telematics system 22, a network system 24, and any other vehicle system that may include a speech dependent application. In some embodiments, one or more of the vehicle systems are communicatively coupled to a network (e.g., a proprietary network, a 4G network, or the like) providing data communication with one or more back-end servers 26.

One or more mobile devices 50 might also be present within vehicle 12, including one or more smart-phones, tablet computers, feature phones, etc. Mobile device 50 may also be communicatively coupled to HMI 14 through a suitable wireless connection (e.g., Bluetooth or WiFi) such that one or more applications resident on mobile device 50 are accessible to user 40 via HMI 14. Speech system 10 communicates with the vehicle systems 14, 16, 18, 20, 22, 24, and 26 through a communication bus and/or other data communication network 29 (e.g., wired, short range wireless, or long range wireless). The communication bus may be, for example, a controller area network (CAN) bus, local interconnect network (LIN) bus, or the like. It will be appreciated that speech system 10 may be used in connection with both vehicle-based environments and non-vehicle-based environments that include one or more speech dependent applications, and the vehicle-based examples provided herein are set forth without loss of generality.

As illustrated, speech system 10 includes a speech understanding module 32, a dialog manager module 34, and a speech generation module 35. These functional modules may be implemented as separate systems or as a combined, integrated system. In general, HMI module 14 receives an acoustic signal (or "speech utterance") 41 from user 40, which is provided to speech understanding module 32. Speech understanding module 32 includes any combination of hardware and/or software configured to processes the speech utterance from HMI module 14 (received via one or more microphones 52) using suitable speech recognition techniques, including, for example, automatic speech recognition and semantic decoding (or spoken language understanding (SLU)). Using such techniques, speech understanding module 32 generates a list (or lists) 33 of possible results from the speech utterance. In one embodiment, list 33 comprises one or more sentence hypothesis representing a probability distribution over the set of utterances that might have been spoken by user 40 (i.e., utterance 41). List 33 might, for example, take the form of an N-best list. In accordance with various embodiments, as described in further detail below, dictation-based speech recognition techniques may be used by module 32 in connection with a "fuzzy" or "partial search" of points-of-interest stored within or otherwise available to navigation system 18.

Dialog manager module 34 includes any combination of hardware and/or software configured to manage an interaction sequence and a selection of speech prompts 42 to be spoken to the user based on list 33. When a list 33 contains more than one possible result, dialog manager module 34 uses disambiguation strategies to manage a dialog of prompts with the user 40 such that a recognized result can be determined. In accordance with exemplary embodiments, dialog manager module 34 is capable of managing dialog contexts, as described in further detail below. Speech generation module 35 includes any combination of hardware and/or software configured to generate spoken prompts 42 to a user 40 based on the dialog determined by the dialog manager module 34. In this regard, speech generation module 35 will generally provide natural language generation (NLG) and speech synthesis, or text-to-speech (TTS).

In addition to spoken dialog, users 40 might also interact with HMI 14 through various buttons, switches, touch-screen user interface elements, gestures (e.g., hand gestures recognized by one or more cameras provided within vehicle 12), and the like. In one embodiment, a button 54 (e.g., a "push-to-talk" button or simply "talk button") is provided within easy reach of one or more users 40. For example, button 54 may be embedded within a steering wheel 56.

Figure 2:
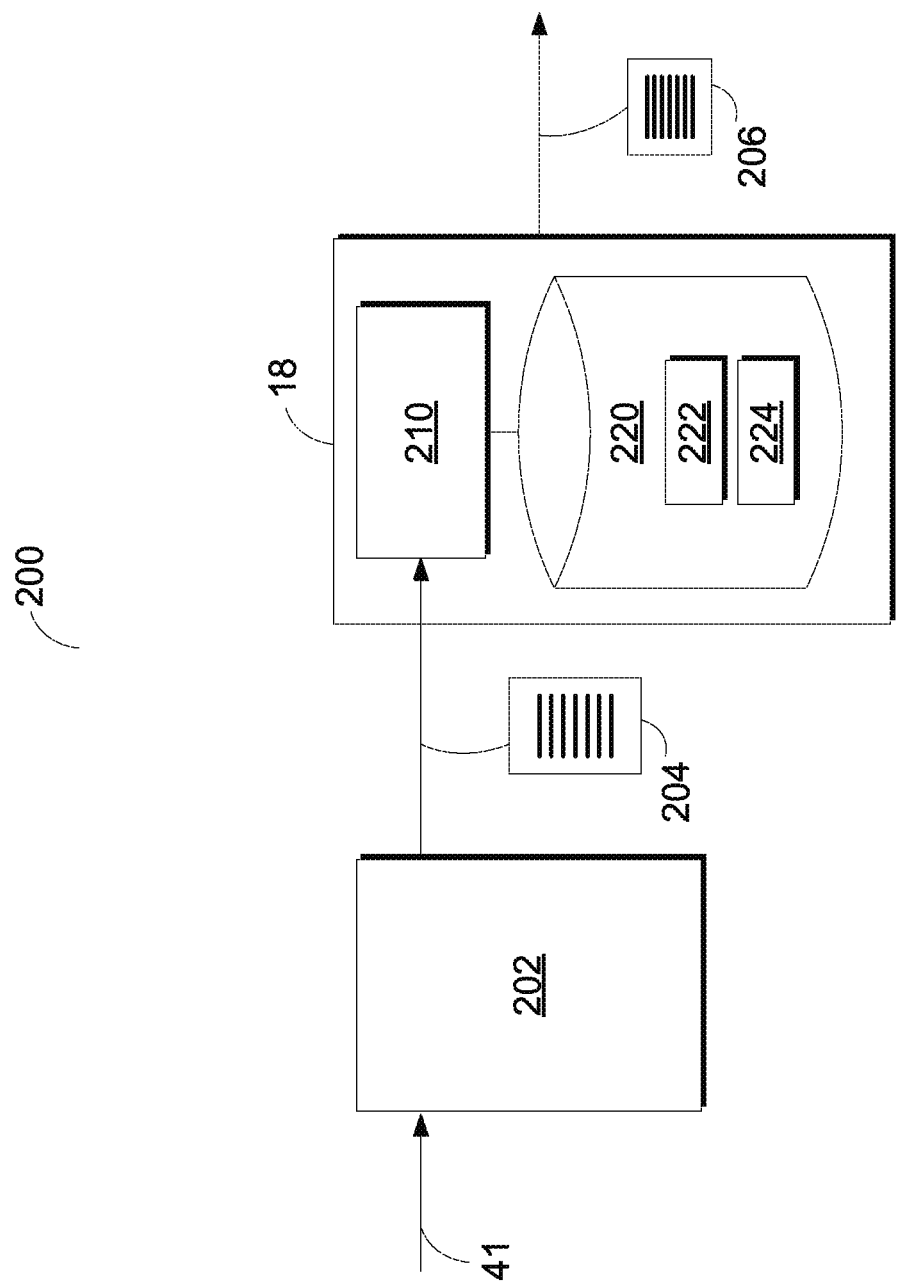
FIG. 2 is a functional block diagram illustrating a navigation system in accordance with an exemplary embodiment.

Referring now to FIG. 2, in accordance with various exemplary embodiments a navigation search system 200 generally includes a dictation module 202 and a navigation system 18 (i.e., as depicted in FIG. 1). Navigation system 18 includes an approximate string matching module (also referred to as a "fuzzy search engine," "search engine," or simply "module") 210, and navigation data 220 (stored via a suitable storage component, such as a CDROM, non-volatile memory, or the like). In this regard, while module 202 and navigation system 18 are illustrated as logically separate modules, it will be appreciated that such modules may be integrated into a single system or subsystem, and further that their respective functionalities may be distributed over one or more other modules, such as those depicted in FIG. 1.

Navigation data 220 includes both phonetic data 222 and text data 224. Navigation data 220 might also include a wide range of other data types (e.g., geometrical data, etc.), which are not illustrated in FIG. 2. Phonetic data 222 refers to suitably encoding sound information that is traditionally in connection with spoken utterance 41 to find a match or a list of likely matches. Text data 224, on the other hand, refers to alphanumeric data, stored in any convenient data structure, corresponding to addresses, points-of-interest, and the like (e.g., "Grand Canyon", "Phil's Bar and Grill", and the like). Text data 224 is typically used, for example, when a user utilizes a touch-screen interface or the like to enter a desired point-of-interest. Approximate string matching module 210 is then used to query text data 224 based on user input, as described below.

Dictation module 202 includes any suitable combination of hardware and/or software configured to receive spoken utterance 41 from a user and process the spoken utterance to produce a dictation text 204 substantially corresponding to the spoken utterance. That is, dictation module 202 attempts to interpret the spoken utterance 41 in any suitable manner to produce dictation text 204. The nature and operation of dictation systems and methods suitable for use with dictation module 202 are known in the art, and need not be described in detail herein. The dictation may be tuned specifically for speech that is typical of navigation destination entry types, thereby improving accuracy. That is, the dictation module 202 may be tuned for the particular navigation context, much in the same way that dictation systems are tuned and suited for legal dictation or medical dictation. For example, the system may be tuned and optimized for the entry of navigation destinations and include POI databases and other navigation-specific data, avoiding some of the constraints of typical navigation data, which requires specific word combinations.

Search module 210 includes any suitable combination of hardware and/or software configured to query navigation system data 220 with the dictation text 204 using an approximate string matching criteria to produce a results list 206 associated therewith. In this regard, the phrase "approximate string matching criteria" refers to any string matching criteria that is not strictly literal—i.e., requiring a nearly identical string of characters. This type of searching might also be referred to as a "fuzzy" search strategy. Such approximate string matching criteria might include, for example, partial search criteria wherein only a portion of the search text need be found in the database (i.e., "Phil's" matching "Phil's Bar." The invention is not so limited, and contemplates a variety of known matching criteria and metrics for determining the "distance" between strings of text. Such fuzzy search strategies are known in the art, and need not be described in detail herein.

Having thus described a navigation search system in accordance with one embodiment, a method in accordance with various embodiments will now be described in conjunction with the flowchart depicted in FIG. 3 and the block diagram of FIG. 2. As shown, method 300 begins at 302 with receipt of a spoken utterance (e.g., spoken utterance of FIG. 1). For example, the user might speak the phrase "Phil's" in the context of a point-of-interest search.

Next, in step 304, dictation module 202 processes spoken utterance 41 to produce dictation text 204. In the present example, that dictation text might be comprise the string "PHILS". In some embodiments, the dictation text is provided to the user (e.g., via HMI 14 of FIG. 1) for modification prior to querying the navigation system data. That is, the dictation text 204 might contain the string "PHILZ", and may be subsequently edited by the user (using a virtual keyboard or the like), so that it is corrected to the string "PHILS" before further processing by the system.

Next, in step 306, module 210 performs a "fuzzy" search (e.g., via a query) of navigation data 220 to determine a results list 206, corresponding to one or more search results ranked by any suitable ranking criteria. Results list 206 is then presented to the user (e.g., via a touchscreen provided by HMI 14) for selection of a desired result (308). The results are typically presented in rank order based on search confidence. For example, results list 206 might include three entries displayed in rank order as "PHILS BAR AND GRILL", "PHILZ HAIR", "BOB AND PHIL TRATTORIA". The user can then select the desired result (in this case, the first result on the list).

In accordance with one embodiment, the selected desired result is stored (e.g., within navigation system 18) and later used adaptively to predict the result desired by the user. That is, system 200 might learn that certain spoken utterances 41 are often referred to in certain ways by a particular user.

In accordance with another embodiment, results list 206 is based on a context associated with the spoken utterance. That is, for example, system 200 might use the current context (e.g., type of vehicle, identity of the driver, time of day, weather conditions, geographic location, etc.) to determine which results of results list 206 are most relevant. In another example, if the user is running low on fuel and one of the entries in results list 206 is a fuel station, that result might be considered most relevant. If the user has historically frequented restaurants over the noon hour and a noontime search produces restaurants, those results might be ranked higher on results list 206. In another embodiment, if there are search results from a geographically diverse area, the system might rank higher those results that are closer to the vehicle's current location.

In summary, what has been described are system and methods that provide greatly improved recognition results by first transforming spoken utterances to dictated text prior to performing a "fuzzy" or otherwise approximated string matching query of the navigation system database based on the dictated text. In this way, the limitations of the navigation system's phonetic data can be avoided.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for searching navigation system data including phonetic data and text data, the method comprising:
    storing the phonetic data and the text data in a storage device accessible from within a mobile platform, the phonetic data including a set of point-of-interest names in phonetic form, and the text data including at least a portion of the same set of point-of-interest names in text form;
    receiving a spoken utterance from a user;
    querying the phonetic data of the navigation system data with the spoken utterance to find a corresponding match;
    if a corresponding word-for-word match is not found via the querying of the phonetic data, processing the spoken utterance to produce a dictation text substantially corresponding to the spoken utterance, wherein the dictation text is tuned for speech that is typical of navigation destination entry types; and
    querying the text data of the navigation system data with the dictation text using an approximate string matching criteria and producing a results list associated therewith.

2. The method of claim 1, wherein the approximate string matching criteria includes a partial text search.

3. The method of claim 1, wherein the navigation system data includes point-of-interest data.

4. The method of claim 1, further including providing the results list to the user for selection of a desired result.

5. The method of claim 4, further including storing the selected desired result and adapting the querying step based on the selected desired result.

6. The method of claim 1, further including producing the results list based on a context associated with the spoken utterance.

7. The method of claim 1, further including providing the dictation text to the user for modification prior to querying the navigation system data.

8. A navigation search system for a vehicle navigation system including phonetic data and text data, the system comprising:
    a storage component for storing the phonetic data and the text data such that it is accessible from within the vehicle, the phonetic data including a set of point-of-interest names in phonetic form, and the text data including at least a portion of the same set of point-of-interest names in text form;
    a speech recognition module configured to query the phonetic data of the navigation system data with a spoken utterance to find a corresponding match;
    a dictation module, including a processor, configured to receive the spoken utterance in the event a corresponding match is not found and process the spoken utterance to produce a dictation text substantially corresponding to the spoken utterance, wherein the dictation text is tuned for speech that is typical of navigation destination entry types; and
    a search module, including the processor, configured to query the text data of the navigation system data with the dictation text using an approximate string matching criteria and to produce a results list associated therewith.

9. The navigation system of claim 8, wherein the approximate string matching criteria includes a partial text search.

10. The navigation system of claim 8, wherein the navigation system data includes point-of-interest data.

11. The navigation system of claim 8, further including a human-machine interface module providing the results list to the user for selection of a desired result.

12. The navigation system 11, further including storing the selected desired result and adapting the querying step based on the selected desired result.

13. The navigation system 11, further including producing the results list based on a context associated with the spoken utterance.

14. The navigation system 11, further including a human-machine interface module configured to provide the dictation text to the user for modification.

15. Non-transitory computer-readable media bearing software instructions configured to instruct a processor to search navigation system data including phonetic data and text data stored in a storage device accessible from within a mobile platform, wherein the phonetic data includes a set of pointof-interest names in phonetic form, and the text data includes at least a portion of the same set of point-of-interest names in text form, by performing the steps of:
- receiving a representation of spoken utterance from a user;
- querying the phonetic data of the navigation system data with the spoken utterance to find a corresponding match;
- if a corresponding match is not found via the querying of the phonetic data, processing the representation of the spoken utterance to produce a dictation text substantially corresponding to the spoken utterance, wherein the dictation text is tuned for speech that is typical of navigation destination entry types; and
- querying the text data of the navigation system data with the dictation text using an approximate string matching criteria and producing a results list associated therewith.

16. The non-transitory computer-readable media of claim 15, wherein the approximate string matching criteria includes a partial text search.

17. The non-transitory computer-readable media of claim 15, wherein the navigation system data includes point-of-interest data.

18. The non-transitory computer-readable media of claim 15, further including providing the results list to the user for selection of a desired result.

19. The non-transitory computer-readable media of claim 18, further including storing the selected desired result and adapting the querying step based on the selected desired result.

20. The non-transitory computer-readable media of claim 15, further including producing the results list based on a context associated with the spoken utterance.

* * * * *